Feb. 24, 1925.

F. LOUISOT

1,527,203

PULP MOLDING APPARATUS

Original Filed Oct. 8, 1920   7 Sheets-Sheet 1

UNITED STATES PATENT OFFICE.

FELIX LOUISOT, OF NEW YORK, N. Y., ASSIGNOR TO VACUUM PULP PRODUCTS CORPORATION, OF NEW YORK, N. Y., A CORPORATION OF VIRGINIA.

PULP-MOLDING APPARATUS.

Application filed October 3, 1920, Serial No. 415,654. Renewed July 17, 1924.

*To all whom it may concern:*

Be it known that I, FELIX LOUISOT, a citizen of the Republic of France, residing at New York, in the county of New York and State of New York, have invented certain new and useful Improvements in Pulp-Molding Apparatus, of which the following is a specification.

My present invention relates generally to apparatus of the character disclosed in my co-pending application #258,187 filed October 15, 1918, and has reference particularly to the structure of the sectional mold and the mechanism for opening and closing the same.

Special objects of the invention are to provide a sectional mold of relatively simple construction, which can be quickly operated to release the molded article, in which the product will not be torn or injured by the separation of the mold section and in which the product will be removed as a part of the mold opening operation.

These objects are accomplished in the structure illustrated in the drawings accompanying and forming a part of this specification, which, however, are to be considered in a descriptive rather than in a limiting sense, since the actual structure may be modified in various respects without departure from the true spirit and scope of the invention as hereinafter defined and claimed.

Figure 1:
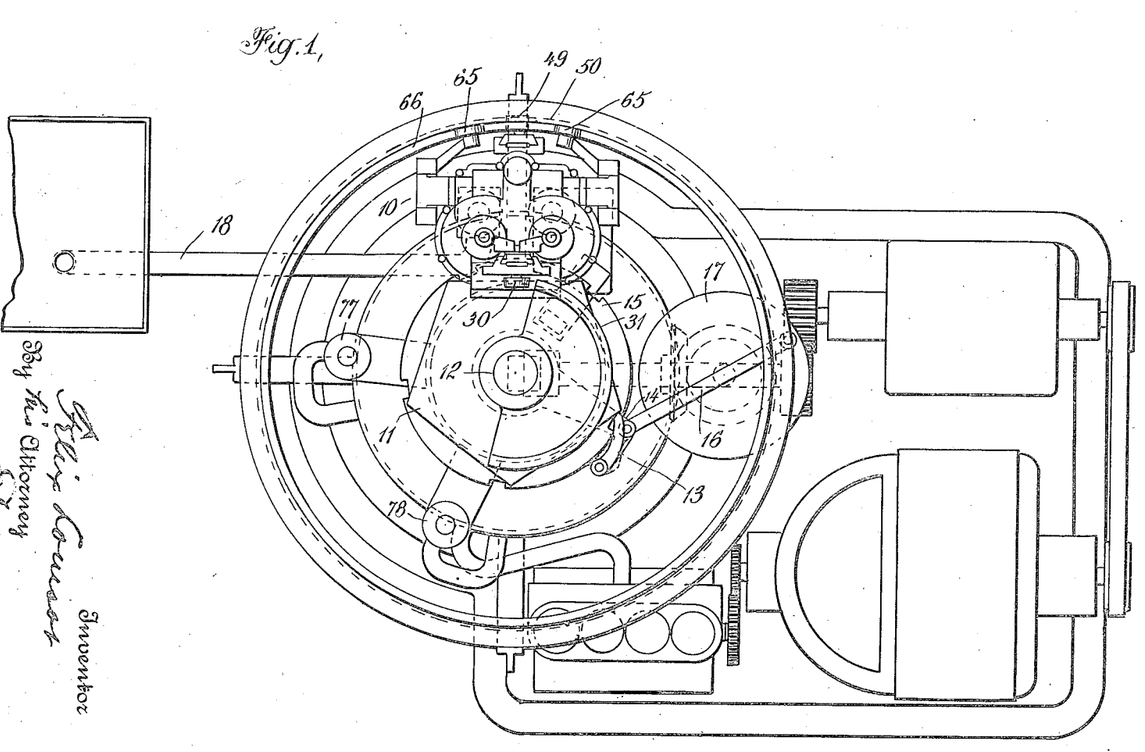
Figure 1 is a partial plan view of the machine of the application referred to, showing one of the molds of the present invention as applied to and forming a part thereof.
Figure 2:
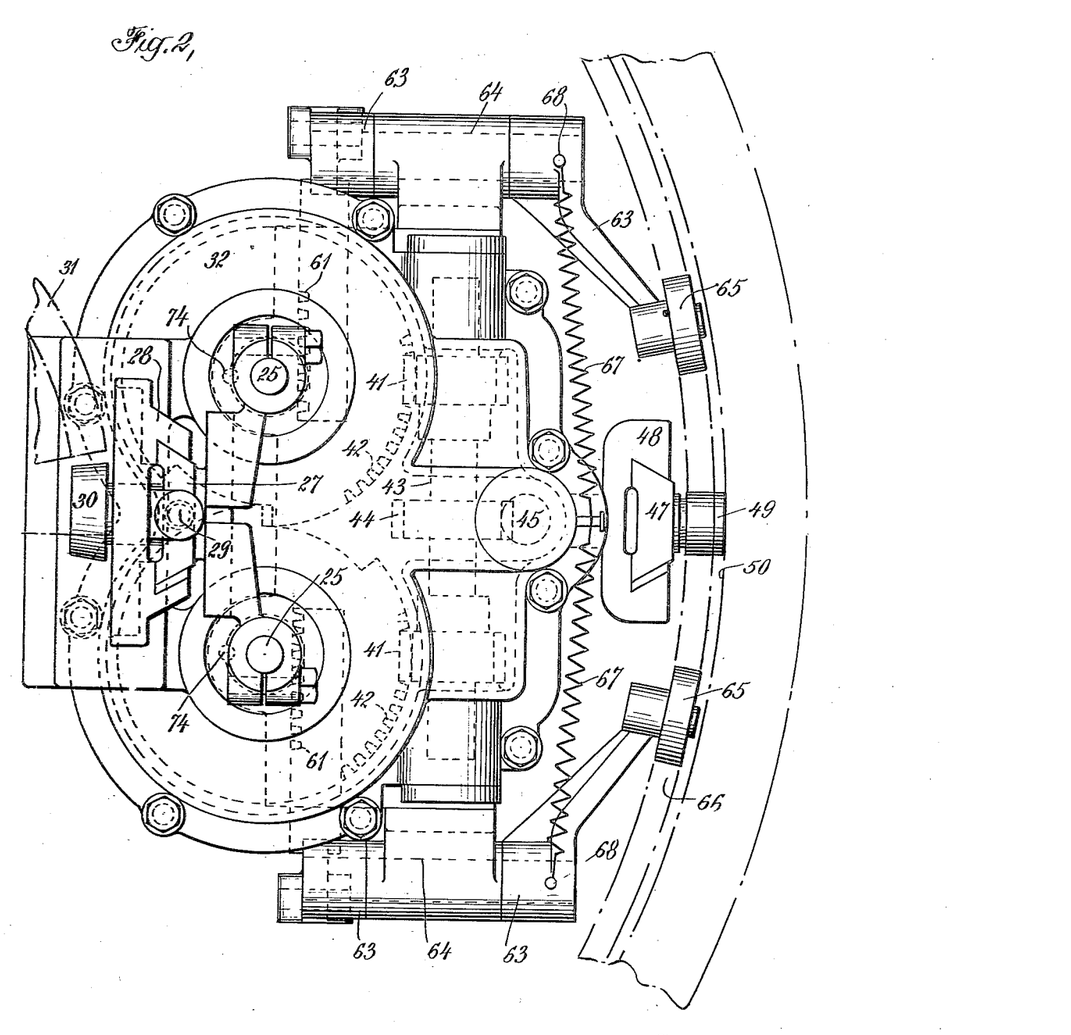
Figure 2 is an enlarged plan view of the mold and adjacent parts.

In Figure 1, I have shown only one of the complete molds, the same being indicated at 10 as applied to one of the faces of a five-sided turret 11, it being understood that similar molds will ordinarily be applied to the other four sides of the turret. This turret is intermittently rotated on its pivotal support 12 by a pawl 13 carried by the pawl lever 14 and engaging the teeth of a ratchet disc 15 affixed to the turret, said pawl lever being oscillated by a link 16 which is connected with the crank disc 17.

Figure 3:
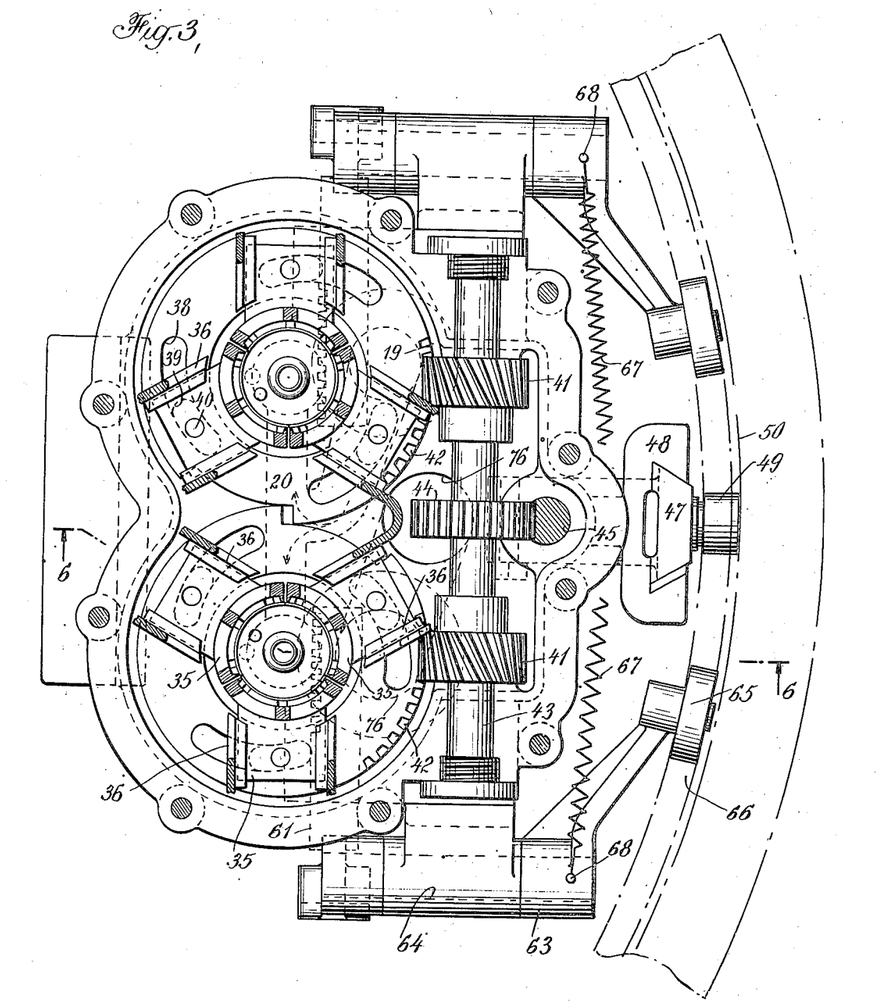
Figure 3 is a horizontal sectional view of the same.

In the position shown, the turret is standing with the mold at rest over the charging station where pulp is supplied through a conduit 18 to the interior of the mold. The pulp inlet to the mold is designated 19 and the same is indicated in Figure 3 as branched at 20 to simultaneously supply a pair of molds.

Figure 6:
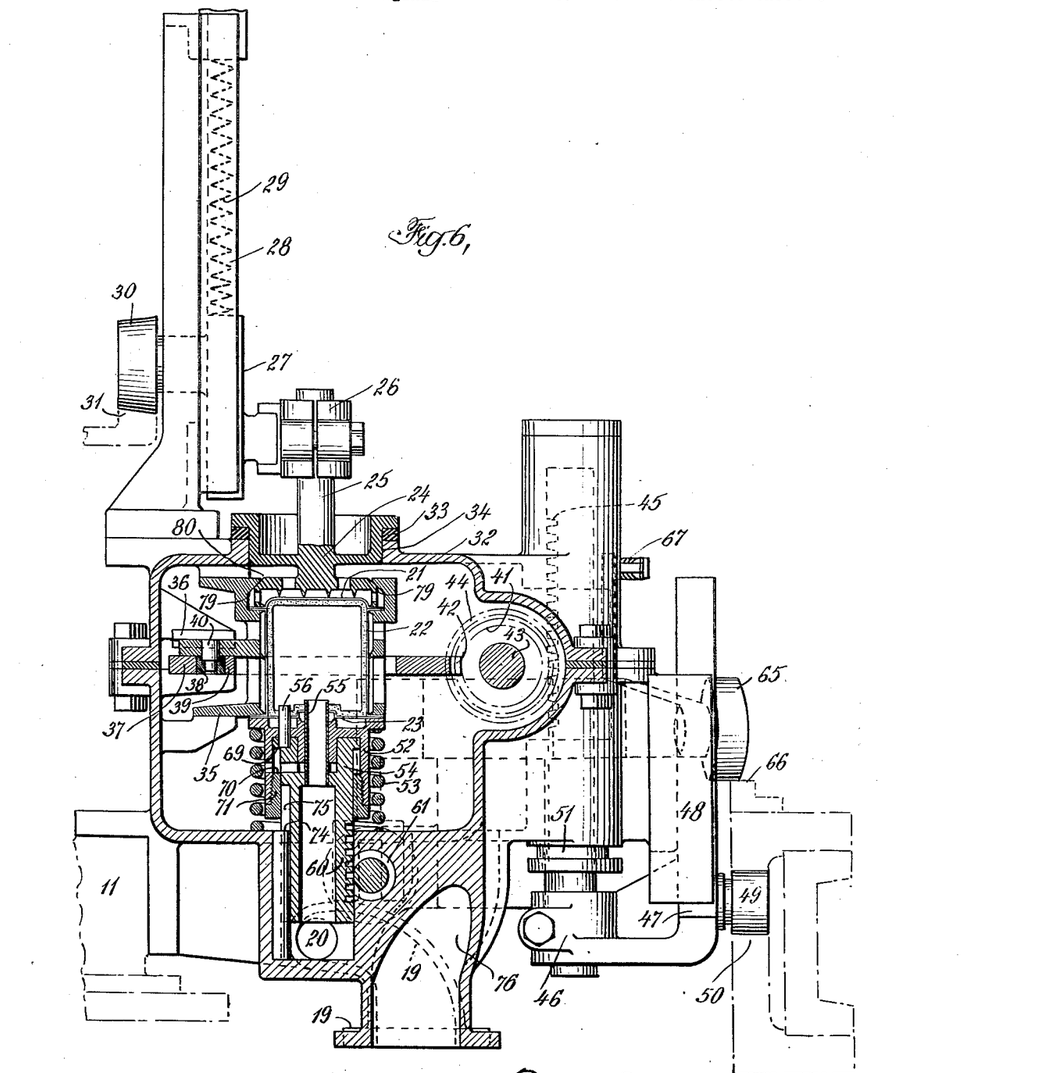
Figure 6 is a vertical section taken on substantially the plane of line 6—6 of Figure 3, showing the parts in the mold closed relation.
Figures 7, 8:
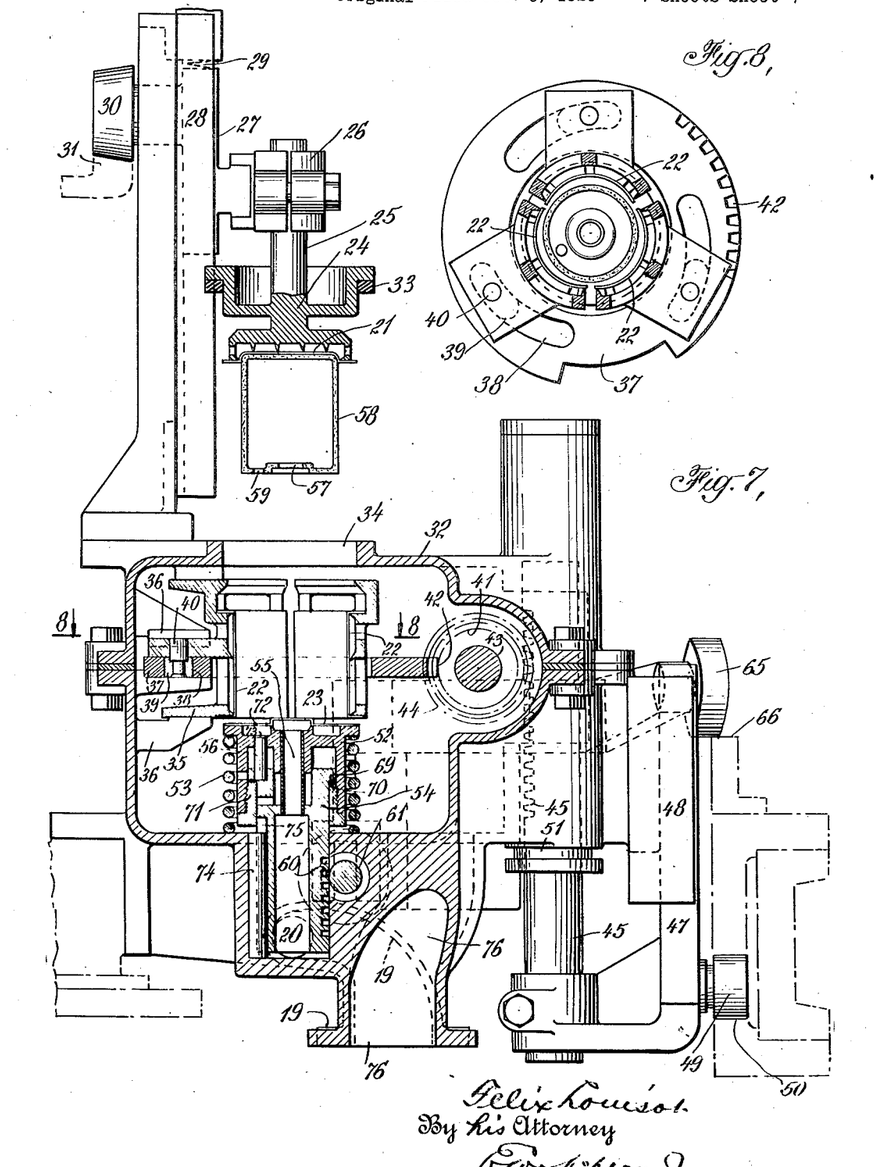
Figure 7 is a similar view, illustrating the opening of the mold and the removal of the molded product.
Figure 8 is a horizontal sectional view of the body of the mold, as taken on substantially the plane of line 8—8 of Figure 7.

The structure of the mold will possibly be best understood by reference to Figures 6, 7 and 8, wherein I have shown the same as each consisting of a top section 21, three co-extensive side sections 22 and a bottom section 23. These mold walls are constructed of fine mesh screen, or other perforate material, suitable for the purpose and are appropriately reinforced by backing members.

The mold top is carried by a head 24 shown as having a step 25 adjustably secured in a clamp 26 which is carried by a slide 27 operating in a vertical guide 28. This slide is shown as forced downwardly by a spring 29 and as lifted at the proper moment in the rotation of the turret by the engagement of a cam roll 30 at the back of the same with an appropriately shaped stationary lifting cam 31.

A special feature of this mold top is that it also provides a closure for the mold enclosing chamber 32, the head being provided for the purpose with a gasket 33 arranged to seal the opening 34 in the top of the mold chamber through which the article is removed.

The side sections of the mold are carried by radially operating slides 35 working in guides 36 (Fig. 3) and which are actuated by a cam disc 37 having inclined or eccentric slots 38 receiving the shoes or slide pieces 39 which are attached to the mold slides by the pins 40.

The cam discs of each pair of molds are simultaneously turned in one direction or the other by spiral gears 41 which engage corresponding gear teeth 42 in the edges of the discs. The gears 41 are mounted on a shaft 43 which carries a pinion 44 engaged by a vertical rack 45 which is adjustably secured by a clamp 46 to the slide 47 operating in a vertical guide 48 and actuated by a roll 49 traveling on a cam track 50. The stem of this rack operates through a stuffing box 51 in the bottom of the mold chamber.

The bottom section of the mold is carried by a plunger 52 and is forced upwardly under tension of spring 53 into cooperating engagement with the side sections. Operating within plunger 52 is a hollow plunger 54 which in the instance illustrated carries a pulp inlet tube 55, projecting up through the mold bottom (Figure 6) into the mold cavity and a pin or plug 56 also projecting up through the mold bottom at one side of the pulp inlet tube. The tube 55 thus provides an inlet for the pulp and also provides an opening which forms the mouth 57 of the completed hollow article 58 (Figure 7) and the plug or core 56 provides an additional opening 59 in the top of the article at one side of the mouth thereof.

Figure 4:
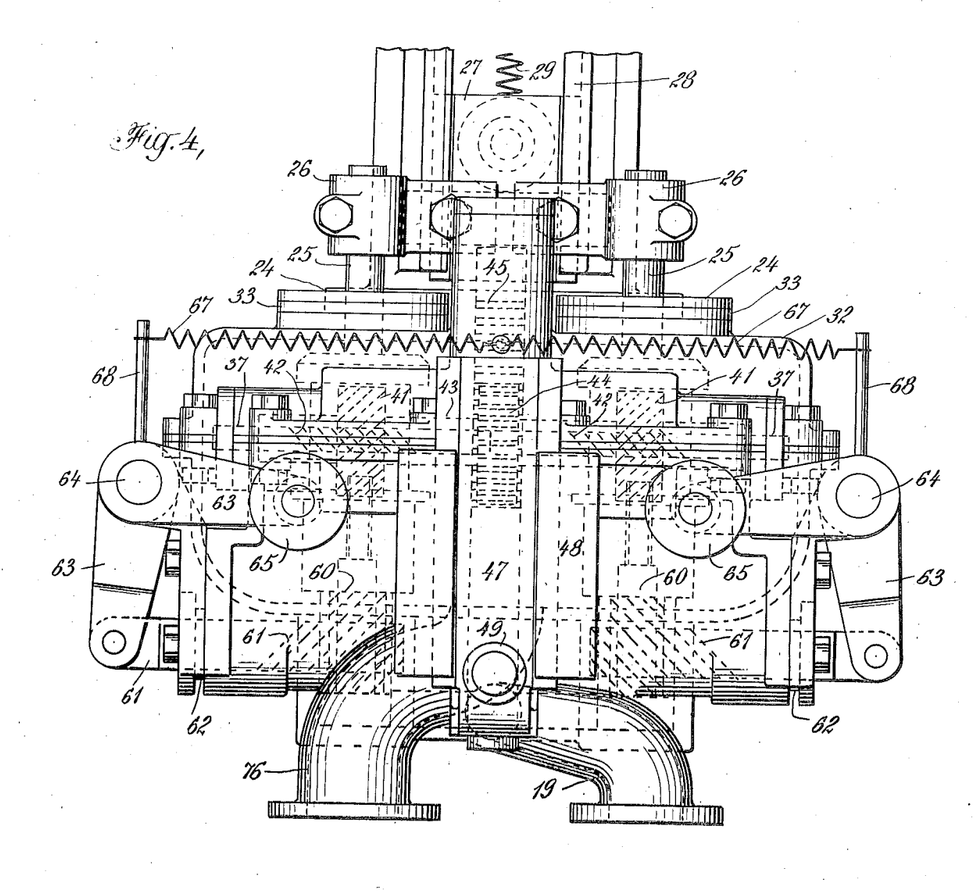
Figure 4 is a side elevation of the mold.
Figure 5:
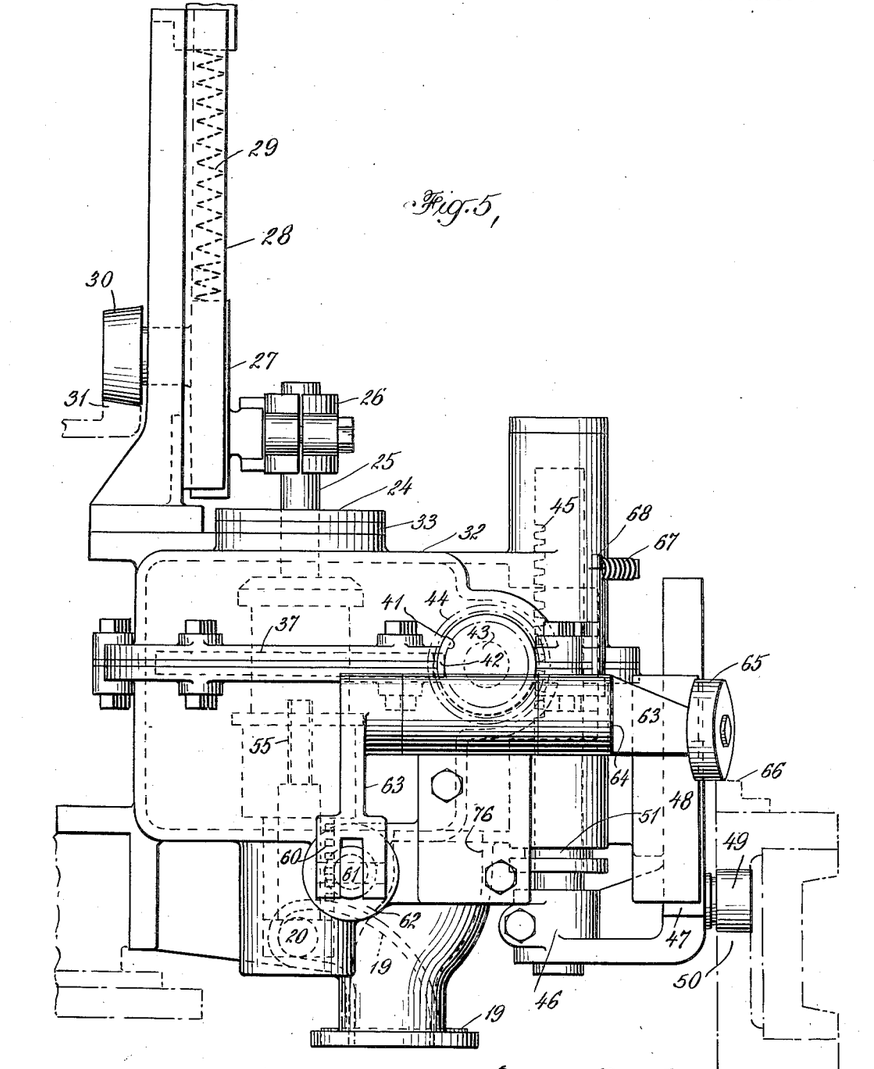
Figure 5 is an edge view.

The plunger 54 has a set of inclined rack teeth 60 at one side thereof engaged by the similarly inclined teeth of a rack 61, which slides through a stuffing box 62 in the side of the mold casing and is actuated by a bellcrank lever 63 pivoted at 64 and carrying a roll 65 engaging the relatively stationary cam track 66. The parts just described are arranged in pairs, as shown in Figure 4, and the bellcranks are rocked to force the rolls in engagement with the cam track by means of spring 67 connected with upstanding pins 68 attached to the bellcranks.

In the first part of the retracting movement of the mold bottom, the inner section 54 is lowered to withdraw the members 55, 56 from the molded article, while the article is still supported by the mold bottom 23. After said elements 55 and 56 have been completely separated from the article, the shoulder 69 on the inner section 54 contacts with a cooperating shoulder 70 on the outer section 52 of the plunger and the outer section, carrying the mold bottom, is thereupon withdrawn as indicated in Figure 7. The shoulder 70 on the outer telescopic section of the plunger is shown as carried by a nut 71 threaded into the lower open end of the section, so as to provide for a certain amount of adjustment of the two parts. The mold bottom 23 has an opening 72 through which the core plug 56 projects and the outer section 52 of the plunger has a guide opening 73 for said plunger to maintain the same in alinement with the opening 72. This prevents relative rotation between the parts of the mold bottom and bodily rotation of the compound plunger is prevented by a key 74 fitting in a key-way 75 cut in the side of the plunger opposite the inclined rack 60.

At the charging station, with the pulp inlet to the mold 19 connected with the pulp supply, suction is applied to the mold chamber, in other words, to the outside of the perforate mold by connecting the outlet 76 from said chamber with a suitable suction coupling, such as disclosed in my application above referred to. The pulp thereupon flows up through pulp inlet 19—20, the hollow plunger supporting the mold bottom and the inlet tube 55 into the mold chamber, producing a deposit such as illustrated in Figure 6, conforming to the outline of the mold walls.

In the particular machine disclosed, after the formation of the article in the mold, compressed air is applied to the inside of the mold by means of an air coupling 77 at the second station for the purpose of expelling further moisture and for further compacting the pulp walls. Also in this particular machine, compressed air is again applied at the third station by a special air coupling 78 to remove so far as possible the last bit of moisture and to give the molded article an air shock or shocks tending to loosen the same from the fabric of the mold. After these operations, the article is ready to be removed from the mold and this is effected in the following order:

In the subsequent rotation of the turret, the cam rolls 65 of the bellcrank levers 63 engage the cam track 66, causing said levers to be rocked upwardly so as to project the racks 61 inwardly, said racks thereupon first lowering the inner sections of the telescopic plungers to withdraw the core elements 55 and 56 and, as the lost motion is taken up between the shoulders 69, 70, then lowering the mold bottom away from the mold side sections (Figure 7). As the mold bottom recedes, the mold side sections open through the rotation of the eccentric discs, the latter coming into operation through the engagement of the cam roll 49 with the cam track 50. The article being thus freed from the mold bottom and sides is then removed from the mold chamber by the lifting of the mold top through the operation of the cam roll 30 over the cam track 31. During this lifting movement, the molded article adheres to the mold top and hence is lifted clear of the mold sections and the mold chamber, as shown in Figure 7. The article is then in position to be readily separated from the mold top by hand or otherwise.

The mold is closed in the reverse order, by first lowering the mold top, then closing the mold side sections and finally bringing up the mold bottom into engagement with the side sections. In this closing operation, the mold top is interlocked to the side sections by the engagement of the beveled shoulders 79 of the side sections over similarly inclined shoulders 80 on the upper face of the mold top reinforcement (Figure 6). The mold when closed passes again to the charging station and the cycle of operations is repeated.

From the foregoing it will be seen that the mold is positive and accurate in its operation and that for the valuable results accomplished, is relatively simple in construction. The shape of the mold and the number of sections of which it is made will, of course, vary with different requirements.

What I claim is:

1. In a mold of the character described, relatively separable top, bottom and side perforate mold sections, a chamber enclosing said mold sections, means for relatively separating the mold sections, and a closure for the chamber carried by one of the mold sections.

2. In a machine of the character described, a perforate sectional mold, a mold enclosing chamber, means for opening the sectional mold, and a closure for the chamber carried by one of said mold sections.

3. In a machine of the character described, a sectional perforate mold, a mold enclosing chamber having an opening in the top thereof to permit the removal of one of the mold sections, means for removing one of the mold sections through that opening, and a closure for the opening carried by said removable mold section.

4. In a machine of the character described, a sectional perforate mold including a removable top section, a mold enclosing chamber having an opening in the top thereof through which the top section is removable, and a closure for said opening carried by said removable top section.

5. In a machine of the character described, a perforate mold having a removable section, a plunger supporting said section, a telescopic element in said plunger, and a core element carried by said telescopic element and arranged to project through the mold section.

6. In a machine of the character described, a sectionalized perforate mold, a core arranged to enter said mold, supporting means for said core and one of the mold sections, including telescopic elements, one carrying the core and the other the mold section, means for retracting the core carrying element, and a lost motion connection between said core carrying element and the other telescopic element.

7. In a machine of the character described, telescopic tubular sections, a perforate mold wall carried by one of said sections, a core element carried by the other section, a lost motion connection between the sections, and means for retracting one of the sections.

8. In a machine of the character described, a pulp conduit, a hollow plunger in communication with said pulp conduit and having telescopically arranged sections with a lost motion connection between the same, a perforate mold wall carried by the outer section, and a pulp supply tube carried by the inner section and arranged to project through the perforate mold wall.

9. In a machine of the character described, a pulp conduit, a hollow plunger in communication with said pulp conduit and having telescopically arranged sections with a lost motion connection between the same, a perforate mold wall carried by the outer section, a pulp supply tube carried by the inner section and arranged to project through the perforate mold wall, and a core projection also carried by the inner section and arranged to project through the perforate mold wall.

10. In a machine of the character described, a pulp conduit, a hollow plunger in communication with said pulp conduit and having telescopically arranged sections with a lost motion connection between the same, a perforate mold wall carried by the outer section, a pulp supply tube carried by the inner section and arranged to project through the perforate mold wall, and means for retracting the inner tubular section to thereby cause the same through the lost motion connection to retract the outer tubular section.

11. In a machine of the character described, a pulp conduit, a hollow plunger in communication with said pulp conduit and having telescopically arranged sections with a lost motion connection between the same, a perforate mold wall carried by the outer section, a pulp supply tube carried by the inner section and arranged to project through the perforate mold wall, means for retracting the inner tubular section to thereby cause the same through the lost motion connection to retract the outer tubular section, and a spring acting on the outer tubular section in opposition to the withdrawing motion.

12. In a machine of the character described, a sectionalized perforate mold, a tubular support for one of the mold sections, a slide operating in said tubular support, a core carried by said slide and arranged to project through the mold section aforesaid, means for operating said slide to withdraw the core, and a lost motion connection between the slide and tubular support for withdrawing the mold section from the other parts of the mold after the withdrawal of said core.

13. In a machine of the character described, a sectionalized perforate mold, a tubular support for one of the mold sections, a slide operating in said tubular support, a core carried by said slide and arranged to project through the mold section aforesaid, means for operating said slide to withdraw the core, a lost motion connection between the slide and tubular support for withdrawing the mold section from the other parts of the mold after the withdrawal of said core, and a spring for holding the removable mold section normally engaged with the other parts of the mold.

14. In a machine of the character described, a sectionalized perforate mold, a tubular support for one of the mold sections, a slide operating in said tubular support, a core carried by said slide and arranged to project through the mold section aforesaid, means for operating said slide to withdraw the core, a lost motion connection between the slide and tubular support for withdrawing the mold section from the other parts of the mold after the withdrawal of said core, the means for withdrawing the slide including a rack carried by the slide having inclined teeth, and a movable rack having cooperating similarly inclined teeth.

15. In a machine of the character described, a sectionalized perforate mold, a vertically operable support for one of the mold sections having a rack with inclined teeth, and a substantially horizontally operating rack having inclined teeth cooperating with the inclined teeth of the rack on the vertical support.

16. In a machine of the character described, a mold chamber, a pair of sectionalized perforate molds therein, racks sliding in through opposite sides of the mold chamber, and supports for sections of both molds operably engaged by said racks.

17. In a machine of the character described, a mold chamber, a pair of sectionalized perforate molds therein, racks sliding in through opposite sides of the mold chamber, supports for sections of both molds operably engaged by said racks, and means for operating the racks including bellcranks provided with cam rolls and a cam track engaged by said cam rolls.

18. In a machine of the character described, a sectionalized mold, a slide supporting one of the mold sections, a rack operably engaging said slide, a bellcrank connected with said rack and provided with a cam roll, and a cam track engageable by said cam roll.

19. In a machine of the character described, opposed perforate mold sections, slides supporting said mold sections, a cam roll carried by one of said sections, a cam track engageable by said roll, a rack operably engaging the slide of the other mold section, a bellcrank connected with said rack and carrying a cam roll, and a cam track engageable by said last-mentioned cam roll.

20. In a machine of the character described, substantially horizontally operable cooperating perforate mold sections, substantially vertically operable perforate mold sections arranged to cooperate with the horizontally operably mold sections, and cam mechanisms for first shifting one of the vertically operable mold sections and for then shifting the horizontally operable mold sections and finally the other vertically operable mold section.

21. In a machine of the character described, separable perforate mold sections, an oscillatable cam for operating the same gearing for oscillating said cam, a rack for turning said gearing, and a cam for actuating said rack.

22. In a machine of the character described, a pair of sectional perforate molds, oscillatable cams for shifting the sections of the molds, gearing for turning said cams, and a rack and pinion for simultaneously actuating the gearing for both cams.

23. In a machine of the character described, a pair of sectional molds, cam rings for shifting the sections of the molds, a shaft, gears on said shaft for turning the cam rings, a pinion on said shaft, and an operating rack engaged with said pinion.

24. In a machine of the character described, a pair of sectional molds, cam rings for shifting the sections of the molds, a shaft, gears on said shaft for turning the cam rings, a pinion on said shaft, an operating rack engaged with said pinion, a cam roll connected with said rack, and a cam track engageable by said roll.

25. In a machine of the character described, a rotating turret, a sectional mold carried thereby and including relatively separable cooperating top, side and botom sections, cam rolls operatively connected with said top, side and bottom mold sections, and cam tracks disposed to be engaged by the respective cam rolls in the rotation of the turret.

26. In a machine of the character described, a rotating turret, a sectional mold carried thereby and including relatively separable cooperating top, side and bottom sections, cam rolls operatively connected with said top, side and bottom mold sections, and cam tracks disposed to be engaged by the respective cam rolls in the rotation of the turret, said cam tracks being positioned and arranged to first actuate the cam roll for withdrawing the bottom mold section, to then operate the cam roll for separating the side mold sections and to thereafter operate the cam roll to separate the top mold section.

27. In a machine of the character described, an intermittently rotated turret, a sectionalized perforate pulp mold carried thereby, a chamber on the turret enclosing said mold and provided with an opening for the removal of the molded product, means operable in the travel of the turret for separating the mold sections, and a closure for the opening in the mold chamber carried by one of the separable mold sections.

In testimony whereof I affix my signature.

FELIX LOUISOT.